US009443166B2

(12) United States Patent
Kinard

(10) Patent No.: US 9,443,166 B2
(45) Date of Patent: Sep. 13, 2016

(54) ANIMAL / PET IDENTIFICATION SYSTEM AND METHOD BASED ON BIOMETRICS

(71) Applicant: William Brian Kinard, Menlo Park, CA (US)

(72) Inventor: William Brian Kinard, Menlo Park, CA (US)

( * ) Notice: Subject to any disclaimer, the term of this patent is extended or adjusted under 35 U.S.C. 154(b) by 83 days.

(21) Appl. No.: 14/472,156

(22) Filed: Aug. 28, 2014

(65) Prior Publication Data

US 2015/0078626 A1 Mar. 19, 2015

Related U.S. Application Data

(60) Provisional application No. 61/879,087, filed on Sep. 17, 2013.

(51) Int. Cl.
*G06K 9/00* (2006.01)
*G06K 9/62* (2006.01)

(52) U.S. Cl.
CPC ......... *G06K 9/6201* (2013.01); *G06K 9/00597* (2013.01); *G06K 9/00617* (2013.01); *G06K 9/00885* (2013.01)

(58) Field of Classification Search
None
See application file for complete search history.

(56) References Cited

U.S. PATENT DOCUMENTS

| 6,229,905 | B1 * | 5/2001 | Suzaki | G06K 9/00597 382/110 |
|---|---|---|---|---|
| 6,320,973 | B2 * | 11/2001 | Suzaki | 382/110 |
| 6,845,382 | B2 * | 1/2005 | Meadows | A01K 11/00 |
| 7,916,900 | B2 * | 3/2011 | Lanier | A61C 19/00 206/223 |
| 8,406,456 | B2 * | 3/2013 | More | G06K 9/4671 380/202 |
| 2002/0017136 | A1 * | 2/2002 | Morimura | G06K 9/0002 73/514.32 |
| 2002/0116390 | A1 * | 8/2002 | Meadows | A01K 11/00 |
| 2004/0153477 | A1 * | 8/2004 | Meadows | A01K 11/00 |
| 2005/0062485 | A1 * | 3/2005 | Hara | G06K 9/0002 324/661 |
| 2006/0104485 | A1 * | 5/2006 | Miller, Jr. | G06K 9/00979 382/115 |
| 2006/0143302 | A1 | 6/2006 | Welsh | |
| 2007/0127781 | A1 * | 6/2007 | Stewart | A01K 11/006 382/110 |
| 2008/0056543 | A1 * | 3/2008 | Morimura | A61B 5/1172 382/124 |
| 2009/0208064 | A1 * | 8/2009 | Cambier | G06K 9/0061 382/110 |
| 2012/0163678 | A1 * | 6/2012 | Du | G06K 9/0061 382/117 |
| 2014/0077932 | A1 * | 3/2014 | Rooyakkers | G08B 5/222 340/7.51 |

FOREIGN PATENT DOCUMENTS

| WO | WO 2012/065031 | 12/2007 |
|---|---|---|
| WO | WO 2010/129074 | 11/2010 |

* cited by examiner

*Primary Examiner* — Wenpeng Chen
(74) *Attorney, Agent, or Firm* — Smyrski Law Group, A P.C.

(57) ABSTRACT

An animal identification system and method is provided. The system includes a biometric sensor configured to capture a biometric feature of an animal as a biometric representation of the animal and a biometric identification module configured to receive the biometric representation of the animal and compare said biometric representation of the animal with stored biometric data for a plurality of animals and evaluate matching characteristics between the biometric representation of the animal and stored biometric data for the plurality of animals. The biometric sensor may include a nose print sensor, capacitive sensor, or camera. The biometric feature may include a nose print, an iris image of an eye of the animal, or an image of the unique vein pattern in the sclera of an eye of the animal.

28 Claims, 10 Drawing Sheets

ANIMAL / PET IDENTIFICATION SYSTEM AND METHOD BASED ON BIOMETRICS

This application claims priority based on U.S. Provisional Patent Application Ser. No. 61/879,087, filed Sep. 17, 2013, inventor William Brian Kinard, the entirety of which is incorporated herein by reference.

BACKGROUND OF THE INVENTION

1. Field of the Invention

This present invention is directed to biometrics, and more specifically, to electronic verification and identification of animals including canines and felines using biometrics.

2. Description of the Related Art

Certain mammal pets (most notably canines and felines) are known to have unique noses, similar in uniqueness to a human's fingerprint. In fact, since 1938, the Canadian Kennel Club has accepted nose prints to identify canines.

Previous designs provide methods and systems for electronically detecting, recording and comparing human fingerprints, but these designs are limited to identifying human fingerprint attributes and do not pertain to animals such as dogs and cats. Dog and cat nose prints, while unique, differ in form from human fingerprints, and devices that employ human fingerprint technology simply will not work with canine or feline nose prints. Fingerprint sensor elements typically work using capacitive, resistive or photonic means to measure a fingerprint and use particular techniques to identify ridges and other attributes exclusively associated with human fingerprints.

Lost pets, without identification, often suffer unnecessary extended loss or euthanasia. The ASPCA estimates that only 2% of lost felines are recovered (www.aspca.org). Further, the ASPCA estimates that only 15-20% of all lost dogs without identification return home. The ASPCA states that about 75% of shelter pets are eventually euthanized at the shelter, not having found their owners.

Further, pedigreed canines and felines are presently registered and monitored voluntarily. A pet is usually deemed a pedigree of a breed if its owner voluntarily registers the pet with the relevant club and the pet's primogenitors can be traced to the same pedigree. Without an efficient and accurate means of identifying an animal, certain pet pedigrees cannot be accurately determined or closely monitored.

There does not exist an apparatus, system or method for detecting, recording and comparing animal physical attributes, such as pet nose prints, in order to match an individual pet with certain information, including the contact information of the pet's owner or caretaker or the pet's pedigree information. A human fingerprint sensor cannot be used to measure the unique patterns on a canine's or feline's nose. Existing human fingerprint sensors and associated identification systems simply cannot be used to identify animals.

It would therefore be beneficial to provide a design that addresses the previous problems associated with animal and pet identification.

SUMMARY OF THE INVENTION

According to one aspect of the present design, there is provided an animal identification system comprising a biometric sensor configured to capture a biometric feature of an animal as a biometric representation of the animal and a biometric identification module configured to receive the biometric representation of the animal and compare said biometric representation of the animal with stored biometric data for a plurality of animals and evaluate matching characteristics between the biometric representation of the animal and stored biometric data for the plurality of animals. The biometric sensor may comprise a nose print sensor, capacitive sensor, or camera. The biometric feature may include a nose print, an iris image of an eye of the animal, or an image of the unique vein pattern in the sclera of an eye of the animal.

According to a second aspect of the present design, there is provided an animal cataloging system comprising a biometric sensor configured to receive a representation of biometric feature of an animal and a biometric catalog module configured to receive the representation of the biometric feature of the animal and store the representation of the biometric feature of the animal with other stored animal biometric data in a database.

According to a third aspect of the present design, there is provided an animal identification method, comprising identifying an animal using an identifying unit, determining a representation of a biometric feature of the animal using at least one biometric sensor, receiving the representation and comparing the representation against at least one of a plurality of stored animal biometric data representations to seek to match the representation a plurality of stored animal representations and potentially determine an identity of the animal.

According to a fourth aspect of the present design, there is provided an animal cataloging method. The method includes identifying an animal using an input device communicating with an identification unit, determining a representation of biometric feature of the animal using at least one biometric sensor, receiving the representation of the animal at a biometric identification unit, and indexing and storing the representation with stored biometric representations of a plurality of animals.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

Figure 1:
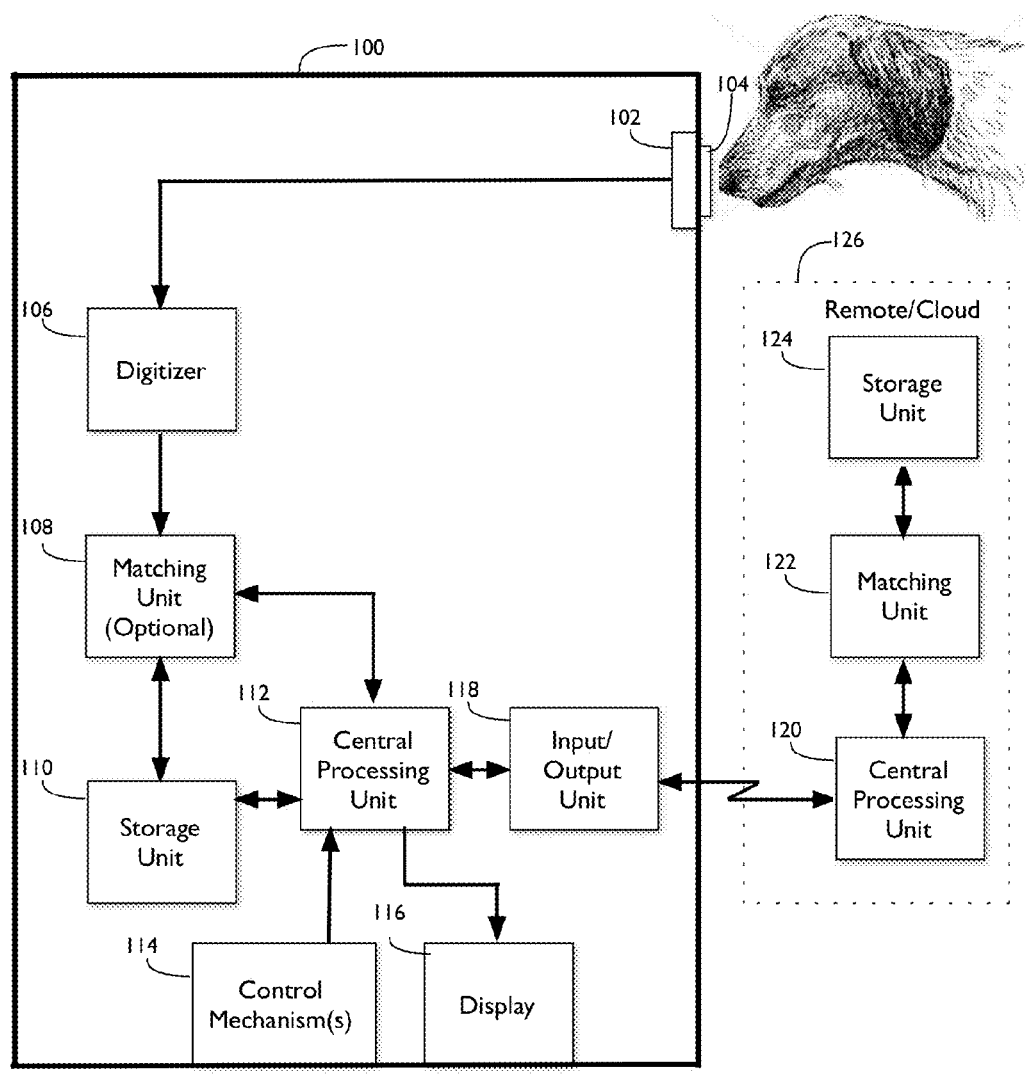
FIG. 1 illustrates an overview of a level diagram of data-processing system(s) in which one embodiment of the present design may be implemented.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The present description employs the term "pet" and "animal" in various contexts. It is intended that either word be employed broadly, i.e. the term "pet" typically means an animal owned by a human, but the term is used by the inventor to represent any type of animal, including wild or stray animals, and the terms "pet" and "animal" are intended to be used with any type of living nonhuman creature and the terms are intended to be interpreted broadly. It is noted that certain animals or pets do not have the unique physical attributes or biometric identifiers, such as nose prints, available in canine and feline animals, but to the extent such creatures can be identified using biometrics in the manner described herein, such creatures may benefit from and be identified using the present invention.

The present invention describes identification systems and methods for animals or pets based on biometric identification. One or more biometric sensors are electronically connected to a data-processing system and storage to compare, identify and match a pet with information in the storage. A biometric feature (as one example, a pet nose print) can be captured as a representation of the biometric feature and measured. A biometric signal or representation indicative of the sensed biometric feature is transmitted to a data-processing system and storage and the signal or representation compared with stored biometric data of multiple animals. If there is a match (or near match) between the biometric signal and certain stored biometric data, then the information associated with the stored and matched biometric data (e.g. animal's identity and address and owner's contact information) can be transmitted to the user, or the animal's owner can be contacted directly.

As far as devices implementing the present design, Apple Computer® recently announced its new iPhone 5S® smartphone with an integrated fingerprint sensor. This sensor is a capacitive sensor with 500 ppi resolution and reads independent of the orientation of the finger. This is revolutionary because of the iPhone 5S®'s integrated computer, pattern-matching circuitry, display, control interface and connectivity to the Internet and cloud, not to mention the expected ubiquitous deployment of the iPhone 5S®. Such a device or other device may be employed with the present design.

One embodiment of the present design identifies canine and feline pets by matching their unique nose print patterns to information in a computer database.

Another embodiment of the present design uses data-processing systems (e.g. computers or smartphones) with biometric sensor, computer, pattern-matching circuitry, display, control interface and connectivity to the Internet and cloud to (i) register a canine or feline pet by recording the pet's unique nose print in a local or off-line computer database along with pertinent information such as the pet's vital information and contact information of its owner or caregiver, and/or (ii) match a pet's unique nose print to a local or off-line database to identify the pet with certain information such as the pet's vital information or contact information of the pet's owner or caregiver. This is useful in identifying lost pets as well as registering and identifying pets with organizations such as kennel clubs, animal shelters and government organizations.

It should be noted that human fingers, while different from animal paw prints or nose prints, are somewhat similar to canine and feline noses in that they have ridges or bumps and carry a certain capacitance, resistance and reaction to sound, photons and other electromagnetic fields such as infrared signals. Further, like human fingers, canine and feline noses have varying temperatures and moisture levels. The present design recognizes both the similarities and differences between human fingerprints and pet nose prints in providing a system for identifying pets in a novel and unique manner.

Figure 2:
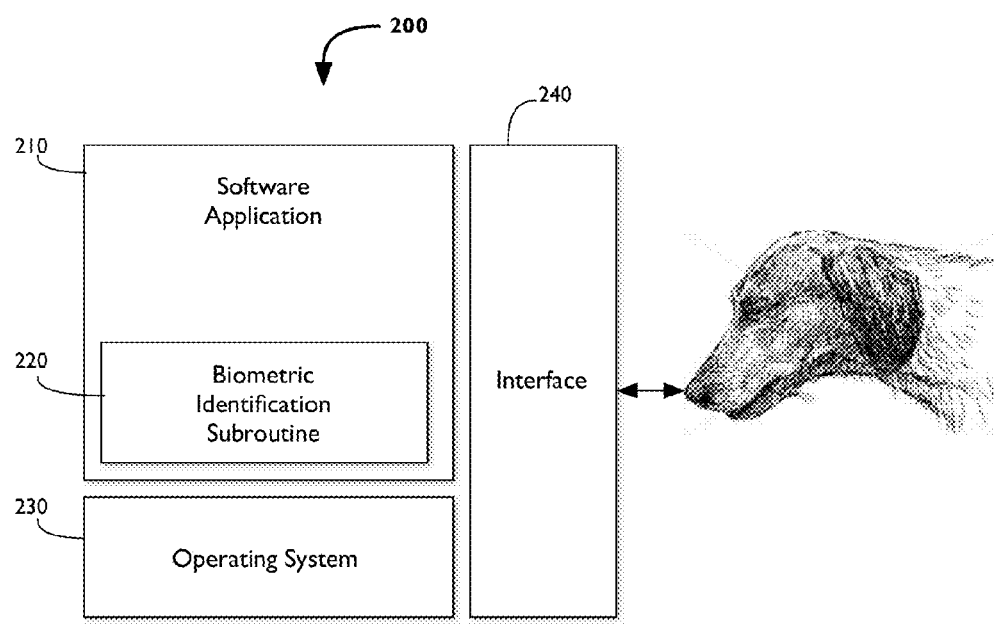
FIG. 2 illustrates one embodiment of a level diagram of a computer software system for directing the operation of the present design.

FIGS. 1-2 are provided as exemplary diagrams of data-processing environments in which embodiments of the present design may be implemented. FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 1, the disclosed embodiments can be implemented in the context of data-processing system(s) comprising, for example, (i) a local data-processing system 100 further comprising a biometric-pet interface 104, a biometric sensor 102, a digitizer 106 to convert the pet's nose print into a digital signature, a central processing unit 112 to process the data and process steps within the data-processing system, a storage unit 110 to store commands, processes and/or data in which to store the pet's information as well as the information of other pets throughout the world, control mechanism(s) 114 to control data or processes or to input data into the data-processing system, a display 116 to show information to the user, and an input/output system 118 to communicate commands and data and (ii) one or more remote or networked data-processing system(s) 126 further comprising a central processing unit 120 to process data within the remote data-processing system(s), a storage unit 124 to store commands, processes and/or data in which to store the pet's information as well as the information of other pets throughout the world or within a specified geographical location and a matching unit 122 to search the storage unit to match a pet's information, including without limitation the pet's nose print, with the information of numerous pets in the computer database storage unit 124. Additional input/output devices may be associated with the data-processing systems 100 and 126 as desired. In another embodiment, as an addition or alternative, a matching unit 108 may be part of the local data-processing system and perform all or part of the functions of the remote matching unit 122. In another embodiment, the central processing units 112 and/or 120 can perform some or all of the matching functions of the matching units 108 and/or 122.

In other embodiments, the connections between the elements in FIG. 1 may be changed to facilitate the exchange of data, signals and information between the elements. The biometric sensor 102 can be a capacitive sensor for capturing and measuring the pet's nose print. Such a capacitive sensor can include, for example, a film or covering 104 to protect the biometric sensor 102 from the external elements without significantly compromising the effectiveness of the biometric sensor 102. The pet nose print sensor 102 detects information by detecting the ridges or bumps and valleys associated with the pet's nose print. The pet's nose can be pressed against the biometric sensor interface 104 to directly measure the contours of the pet's nose by sensing the properties of the nose. The biometric sensor 102 can measure a pet's nose print by other means, such as for example, resistive, inductive, photonic means, etc. The use of a capacitive sensor for biometric sensor 104 is optional, and other types of biometric sensors can also be used to implement the biometric sensor 102 and interface 104. Further, by photonic means, one may employ a photonic device whereby the nose print is pressed against a clear plate (such as glass) with a known index of refraction. The reflection of light from the other side of the glass can be used to determine the nose print image. Alternatively, one could use a photonic device (such as a camera) and ambient or artificial light to determine a nose print image without intimate contact of the pet's nose to the sensor. Further, the pet's nose may not be in intimate contact with the biometric sensor 102, such as in the case of a camera configured to capture a nose print.

Still other embodiments of a biometric sensor could be a device (such as a camera) to measure the unique iris or veins in the sclera of a pet's eyes. The biometric sensor 102 and interface 104 may not be sufficient to measure the whole of the pet's nose, but the biometric sensor 102 and interface 104 will measure a sufficient amount of information to identify or distinguish the pet among other pets' nose prints in the database storage 110 and/or 124; or alternatively several adjacent or overlapping partial nose prints may be captured and aggregated by the central processing unit 112 and/or 120 to collect sufficient unique biometric data.

The biometric sensor 102 can capture the nose print sample and transmit the nose print sample to the digitizer 106 where the background information is removed and the analog signal is digitized. In another embodiment, the unnecessary background information is measured and removed by the biometric sensor circuit 102 and/or the central processing unit 112. This digital nose print sample is then transmitted to the central processing unit 112 where the nose print sample is associated with other pet information and data (e.g. pet's name and address, owner contact information etc.) either already stored in the storage unit 110 or inputted by the user through the control mechanism(s) 114. The central processing unit 112 can then transmit this information, data and pet nose print to the remote computer 126 via the input/output unit 118. The central processing unit 120 can then use the matching unit 122 to compare the pet's nose print to the database of nose prints stored in the storage unit 124 to find a match. Alternatively, the central processing unit 120 can convert the nose print to a smaller, simpler template of the nose print (covered below and in FIG. 10), which is still unique to the pet, and use the matching unit 122 to compare the pet's nose print template to the database of nose print templates stored in the storage unit 124 to find a match. If a match is found, the central processing unit 120 transmits the matched pet's data and information back to the central processing unit 112 via the input/output unit 118 where the data can be communicated to the user via the display 116.

In another embodiment, the information, data and nose print and/or nose print template originally communicated to central processing unit 120 from central processing unit 112 via the input/output unit 118 is merely stored in storage unit 124 to become part of the database of a plurality of pet's information, data and nose prints. In yet another embodiment, the information, data and nose print and/or nose print template originally communicated to central processing unit 112 is merely stored in storage unit 110 to become part of the database of a plurality of pet's information, data and nose prints and/or nose print templates store there. Alternately, the matching unit 108 may compare the nose print and/or template sample with a database of nose prints and/or templates stored in storage unit 110 and/or received from the remote computer 126 instead of, in addition to, or in coordination with the matching functions performed by matching unit 122.

The following discussion is intended to provide a brief, general description of suitable computing environments in which the system and method may be implemented. Although not required, the disclosed embodiments will be described in general context of computer-executable instructions, such as program modules, being executed by one or more computers.

Generally, computer programs include, but are not limited to, routines, subroutines, software applications, program, objects, components, data structures, etc. that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor based or programmable consumer electronics, networked computers, minicomputers, mainframe computers, servers and the like.

Modules as used herein may refer to a collection of routines and data structures that perform a particular task or implements a particular abstract data type. Modules may be composed of two parts—an interface, which lists the constants, data types, variables, and routines that can be accessed by other modules or routines, and an implementation, which is typically private (i.e. accessible to only that module) and which includes source code that actually implements the routines in the module. The term module may also simply refer to an application, such as a computer program designed to assist in the performance of a specific task, such as word processing, accounting, inventory management, etc.

FIG. 2 illustrates a computer-software system 200 for directing the operation of the data-processing systems 100 and 126 depicted in FIG. 1. Software application 210 stored in memories 110 and/or 124 generally includes an operating system 230 and an interface 240. One or more application programs, such as software application 210, can be loaded or transferred from the storage units 110 and/or 124 for execution by the matching units 108 and/or 122, central processing units 112 and/or 120 and more generally the data-processing systems 100 and 126. The data-processing systems 100 and 126 receive user commands and data through the user interface 240; and these inputs may then be acted upon by the data-processing systems 100 and/or 126 in accordance with instructions from operating system 230 and/or software application 210.

The interface 240, which may be a graphical user interface (GUI) and a biometric sensor module, whereupon the user and/or pet may supply additional inputs or initiate or terminate a particular session. In some embodiments, operating system 230 and interface 240 can be implemented in the context of an object-oriented or "Windows" based system. Other types of systems may be employed. For example, rather than a traditional object-oriented or "Windows" system, other operation systems, such as, for example, Apple's iOS or Mac operating system, Google's Android or Linux may also be employed with respect to the operating system 230 and interface 240. The software application 210 can include, for example, a biometric identification subroutine 220 for identifying a biometric feature of pets in order to provide an connection between a pet and identification data to that pet, including the pet's owner, contact information etc. Software application 210, on the other hand, can include instructions, such as the various operations described herein with respect to the various components and modules described herein, such as for example, the methods illustrated in FIGS. 5 through 8 and 10.

Figure 3:
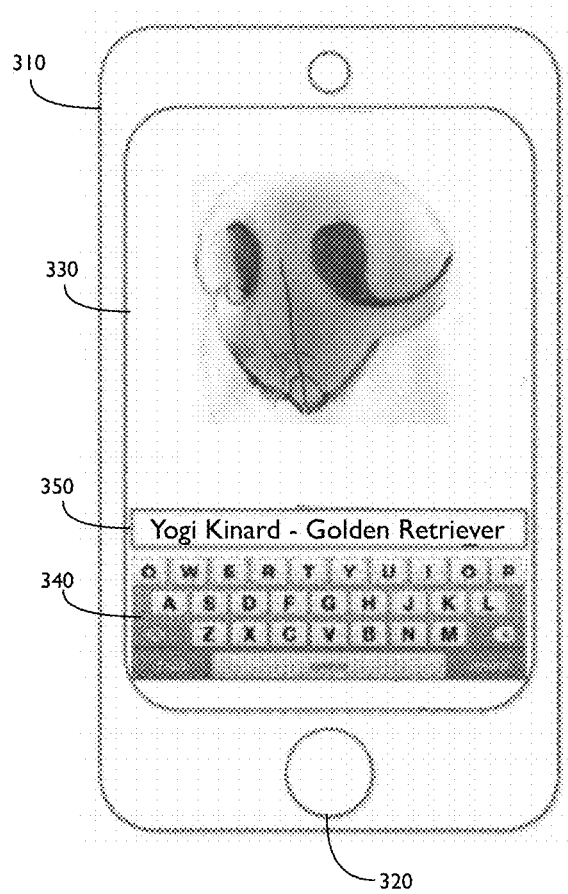
FIG. 3 is a perspective view of a mobile communications device, or smartphone, which integrates network-connected sensor, matching circuit, computer, display, input devices and interface.

FIG. 3 is a perspective view of a mobile communication device 310, also known as a smartphone because it integrates all or most of the elements of 100 in FIG. 1 and 200 in FIG. 2. In one embodiment, the biometric sensor can be integrated into the smartphone 310, for example, in the button 320 (which is similar to the biometric sensor interface 104), which can also serve as part or all of the control mechanism 114. Further, the control mechanism 340 and 114 can be an integrated keyboard or integrated into the display 330 and 116, for example as a touch-sensitive display. Further, the display 330 and 116 can also show pet's information as shown in 350. Some or all of the other elements of FIG. 1 and FIG. 2 are integrated into the smartphone 310. The smartphone's integrated communications systems 310 (e.g. wired connection, cellular connection, WiFi connection etc.) can communicate information and data with the remote data-processing system(s) 126 and serve as the input/output unit 118. Further, the smartphone 310 integrates some or all of the computer software system 200 for directing the operation of the present design. In another embodiment, the smartphone's integrated or a connected camera may be used to capture a pet's nose print.

Figure 4:
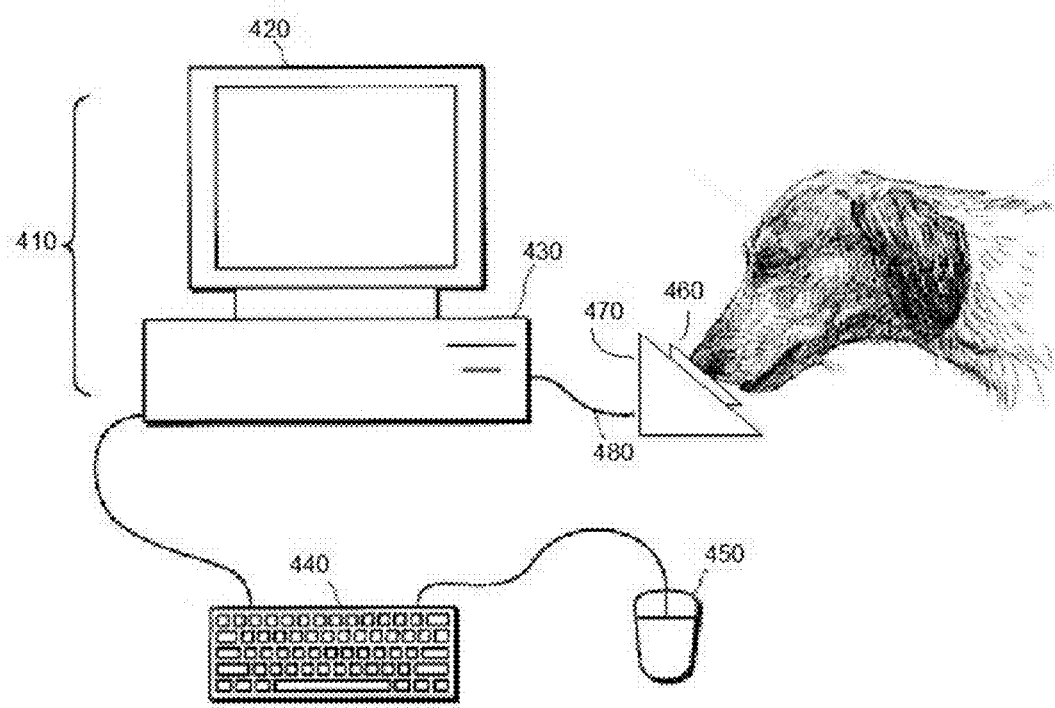
FIG. 4 is a functional block diagram of one embodiment of a network-connected sensor, matching circuit, computer, display, input devices and interface.

FIG. 4 illustrates yet another physical embodiment in the form of a desktop personal computer (PC). Of course, a person skilled in the art can also perceive other embodiments, including without limitation, a laptop computer. In FIG. 4, the biometric sensor interface 460 and biometric sensor 470 are the biometric sensor interface 104 and sensor 102 respectively in FIG. 1. In one embodiment, the digitizer 106 and matching unit 108 can be integrated into the biometric sensor 470. The biometric sensor 470 is connected to the PC 410 via electronic cable 480 or wireless (e.g. Bluetooth, WiFi etc.). The display 420 is similar or identical to the display 116 in FIG. 1. The PC 430 contains some or all of the elements of 100 in FIG. 1, such as sensor 102, digitizer 106, matching unit 108, storage unit 110, CPU 112, and input/output unit 118. In one embodiment, the keyboard 440 and mouse 450 serve as the control mechanisms 114 of FIG. 1. Further the PC 410 integrates some or all of the computer software system 200 for directing the operation of the present design. In another embodiment, a PC's integrated camera or a connected camera may be used to capture a pet's nose print, which in the latter case is then transmitted to the PC 430 via a cable connected to the camera and PC or wirelessly via Bluetooth, WiFi or otherwise.

Figure 5:
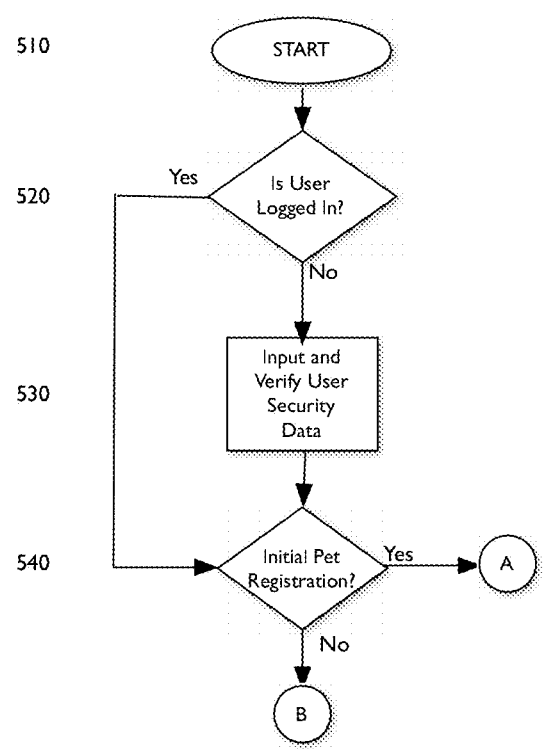
FIG. 5 is a flowchart illustrating logging into the system and determining whether to (i) initially register a pet, (ii) find and contact the owner of a lost pet, or (iii) register a pet that is already lost.

FIG. 5 illustrates a high-level flowchart of the initial startup of the present design. When the user starts the process 510, either by launching the software application 210 in the data-processing system 100 or by starting the software application 210 that has already been launched in the data-processing system 100, the user is either checked internally to determine if the user is authorized to use the system (i.e. logged in) or prompted 520 to determine whether or not the user is logged into the system. If the user is not logged in, the user will be prompted by the system via the display 116 or other means and will input the relevant login data 530 via the control mechanism 114 and/or the biometric sensor 102, which will in this case be used as a human fingerprint sensor and user authentication system to identify, verify and authenticate the user to use the design. If the user is already logged into the system, the system jumps past the login and verification to the first prompt 540. After logged in, the user will be prompted 540 via the display 116 or other means to decide one of three pathways through the system—(i) initially register a pet (process flow A in FIG. 6), (ii) find and contact the owner of a lost pet that is with the user (process flows B and C in FIG. 7), or (iii) register a pet that is already lost (process flow D in FIG. 8). Whereas one embodiment performs all of the functions in FIG. 5 locally within the data-processing system 100, some or all of the functions in FIG. 5 can be performed in the data-processing system 126.

Figure 6:
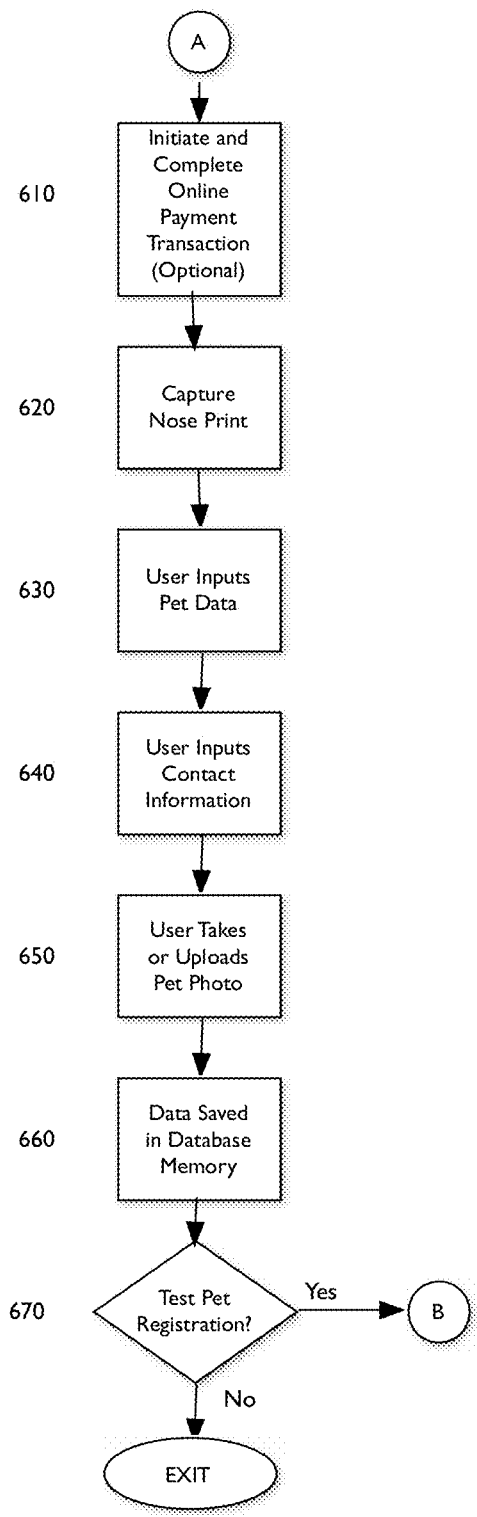
FIG. 6 is a flowchart illustrating initially registering a pet's name, address, owner's contact information, pet's photo(s) and other information.

FIG. 6 illustrates a high-level flowchart of initially registering a pet's name, address, owner's contact information, pet's photo(s) and other information into the computer database storage unit 110 and/or 124. When the user wishes to register the pet for the first time, the pet's biometric data and/or relevant information (e.g. pet's name, pet's address, owner's contact information, pet's photo etc.) may be loaded into the storage 110 and/or 124 and properly indexed for later search and retrieval. It is well known in the art how to create a database of fields, load data into these fields, index data and search relevant data within these fields. It is also well known in the art how to convert a fingerprint into a mathematical description or digital template of the fingerprint data and how to match those data to other stored fingerprint data in a database. One embodiment of the present design creates, converts to a template, stores, indexes and matches the ridges or bumps and valleys of a pet's nose print at point 620 as discussed below. The user captures the lost pet's nose print and/or template at point 620, and the data-processing systems 100 and/or 126 processes and stores the pet's nose print in storage 110 and/or 124. The captured nose print's integrity can be visually verified by the user as illustrated in 330 of FIG. 3. Further, capturing, digitizing, and storing a pet's nose print and/or template is described above in the paragraphs describing FIG. 1 and applies to this description of capturing a nose print and/or template 620.

Using the control mechanism(s) 114 and display 116, the user can add relevant information at points 630, 640 and 650 and other information to the storage 110 and/or 124 and associate such information to the pet's nose print signature for additional indexing and searching. Such information can include, without limitation, the pet's name, address, medical information, owner's contact information etc. Further, the user can use the camera typically integrated into a smartphone to take a picture of the pet, upload it to the storage 110 and/or 124 and associate the photo to the pet's other information for additional indexing and searching. Once the user has reviewed and approved all relevant pet information, said information can be saved at point 660 in the storage 110 and/or 124 and added to the plurality of other pets' information on the said storage. As a final test of the efficacy of the information upload at point 670, the user can test the search capabilities of present design by performing a new search of the pet on the database as if the pet were lost (process flows B and C of FIG. 7). Optionally, the user may be prompted to initiate and complete an online, network-connected payment transaction at point 610, which is well known in the art. Whereas one embodiment performs all of the functions in FIG. 6 locally within the data-processing system 100, some or all of the functions in FIG. 6 can be performed in the data-processing system 126.

Figure 7:
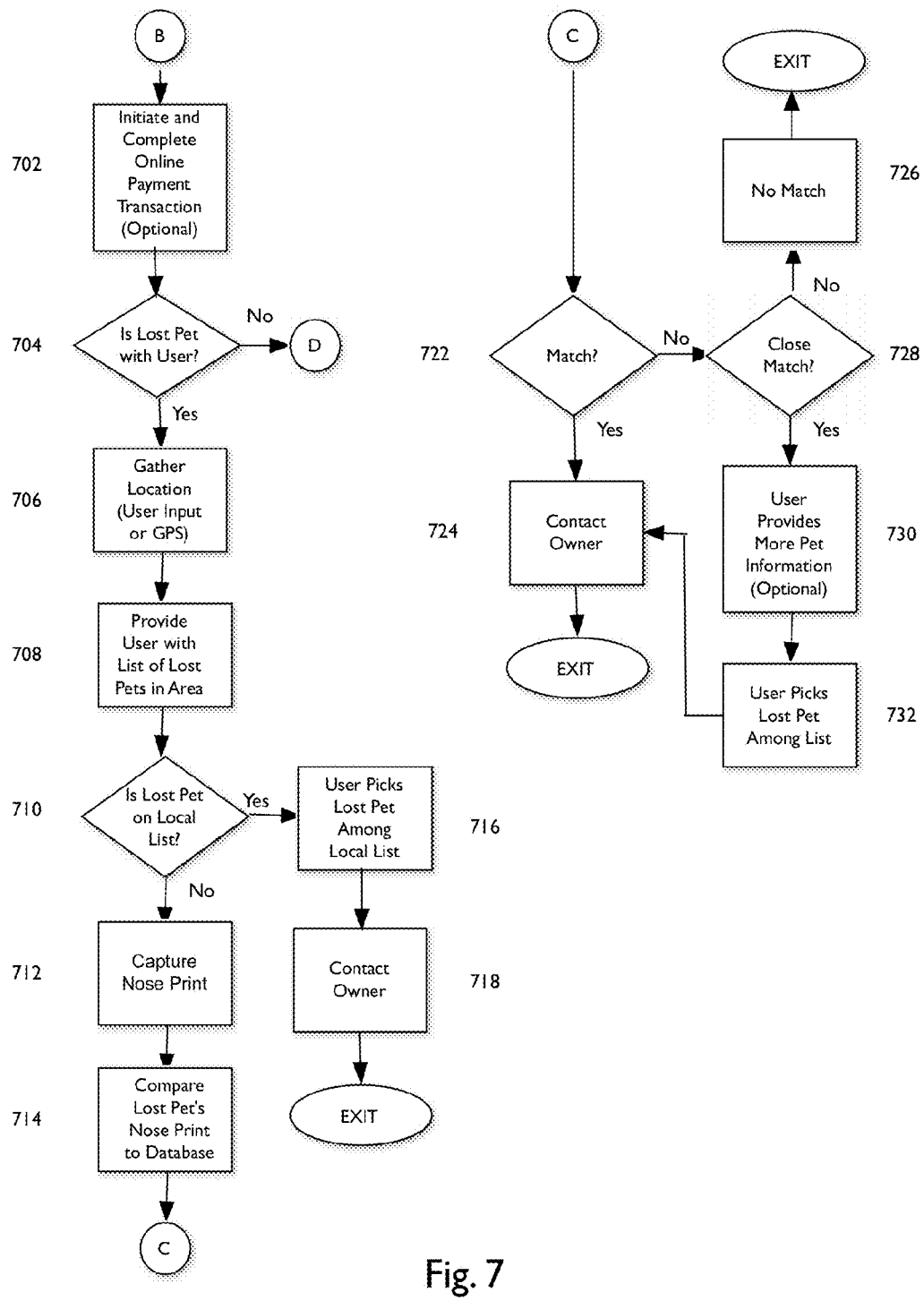
FIG. 7 is a flowchart illustrating finding a lost pet's owner(s) and contacting the owner(s)

FIG. 7 illustrates a high-level flowchart of finding a lost pet's owner(s) and then contacting the owner(s). The user may initially be prompted to initiate and complete an online, network-connected payment transaction 702, which is well known in the art, but such a transaction is optional. The present design determines at point 704 whether (i) the user is searching for the owner of a lost pet that is in the user's possession or (ii) the user is the pet's owner and is registering a lost pet. If the user is the pet's owner and is registering a lost pet, then the user is directed to process flow D in FIG. 8. The present design embodies (and FIG. 8 describes more fully) the means to register a lost pet and gives, among other information, the approximate location of the lost pet. If the user is searching for the owner of a lost pet that is in the user's possession, the geographic location of a pet in the user's possession is determined at point 706 in one or both of two ways—(i) the integrated global position system (GPS) in most smartphones can locate the user and pet and/or (ii) the user can use the control mechanism(s) 114 and display 116 to input the user's and pet's location into the data-processing system 100 and/or 126.

In alternative embodiments, a smartphone may use local wireless networks or cell phone transceivers to locate a smartphone and the pet. This geographic location of the pet is beneficial in decreasing the searchable database of possible matched pets, thereby increasing the accuracy and decreasing the time of the search. The user is prompted with a list of pets that have been registered as lost in the database storage 110 and/or 124 in the geographic area close to the lost pet that is with the user at point 708. The present design may thus serve as a quick means to contact the owner of a lost pet through this present embodiment according to points 710, 716 and 718. If the lost pet that is with the user is not on the list of registered lost pets, the user will capture the lost pet's nose print at point 712, and the data-processing systems 100 and/or 126 will compare the pet's nose print and/or template to other nose prints and/or templates stored in storage 110 and/or 124 to see if there is a match using the matching unit 108 and/or 122. Further, capturing, digitizing, and storing a pet's nose print and/or template is described above in the paragraphs describing FIG. 1 and is incorporated into this description of capturing a nose print at point 712. Given that there should be a very large number of pets registered and their information stored in the storage 110 and/or 124, knowing the present geographic location of the lost pet will aid the matching unit 108 and/or 122 in narrowing at point 714 the large list of possible matches down to either (i) one pet at point 722 and contact the pet's owner at point 724 or (ii) a short list of pets at point 728 in which the user can provide more information on the lost pet at point 730 (in which case the list of possible matches is narrowed even more) and/or pick the lost pet from a narrow list of potential matches at point 732, in which case the owner is contacted at point 724. If the lost pet is not matched with any pets in the registered database storage 110 and/or 124, then the user is prompted that there are no matches at point 726 and the user is given the contact information of local animal shelter(s) to assist the user to safely deliver the pet over to them and is provided with the option of registering the lost pet's information and nose print and/or template via the process flow A in FIG. 6.

The data-processing system 100 and/or 126 contacts the owner of the pet at points 718 or 724 to notify the owner that the pet has been found. In another embodiment, the data-processing system 100 and/or 126 provides the pet owner's contact information to the user so that the user can contact the pet's owner at points 718 or 724 directly. Whereas one embodiment performs all of the functions in FIG. 7 locally within the data-processing system 100, some or all of the functions in FIG. 7 can be performed in the data-processing system 126.

Figure 8:
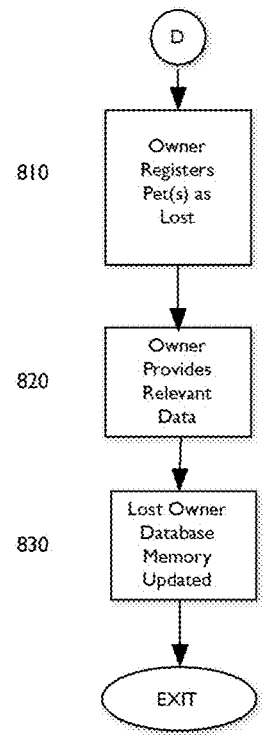
FIG. 8 is a flowchart illustrating (i) registering a pet that is already lost or (ii) noting and indexing that the already-registered pet has been lost.

FIG. 8 illustrates a high-level flowchart of (i) registering the user's pet that is already lost and/or (ii) updating the computer database storage 110 and/or 124 to note that the already-registered pet has been lost. The present design embodies (and this FIG. 8 describes more fully) the means to register a lost pet and give, among other information, the approximate location of the lost pet. If an owner's pet is already registered in the database 110 and/or 124, the user employs the control mechanism(s) 114 and display 116 to note that the pet is lost at point 810, provide any updated information to assist in finding the lost pet at point 820 such as the approximate location of the pet, and then the data-processing system 100 and/or 126 updates at point 830 the information in the database storage 110 and/or 124 to index and note that the pet is lost.

Alternatively, if the user has not previously registered a pet's information (including nose print) with the present design, the user can still use the present design to register the pet as lost at point 810, provide relevant information about the pet such as the approximate location of the pet, the pet's breed and distinguishing characteristics, the pet's name, the owner's contact information etc. at point 820. The data-processing system 100 and/or 126 adds at point 830 the information to the database storage 110 and/or 124 and then indexes and notes that the pet is lost. In this embodiment, in the circumstance where the lost pet has not been previously registered, the search will be performed in the data-processing system 100 and/or 126 without the pet's nose print and/or template. Whereas one embodiment performs all of the functions in FIG. 8 locally within the data-processing system 100, some or all of the functions in FIG. 8 can be performed in the data-processing system 126.

Figure 9:
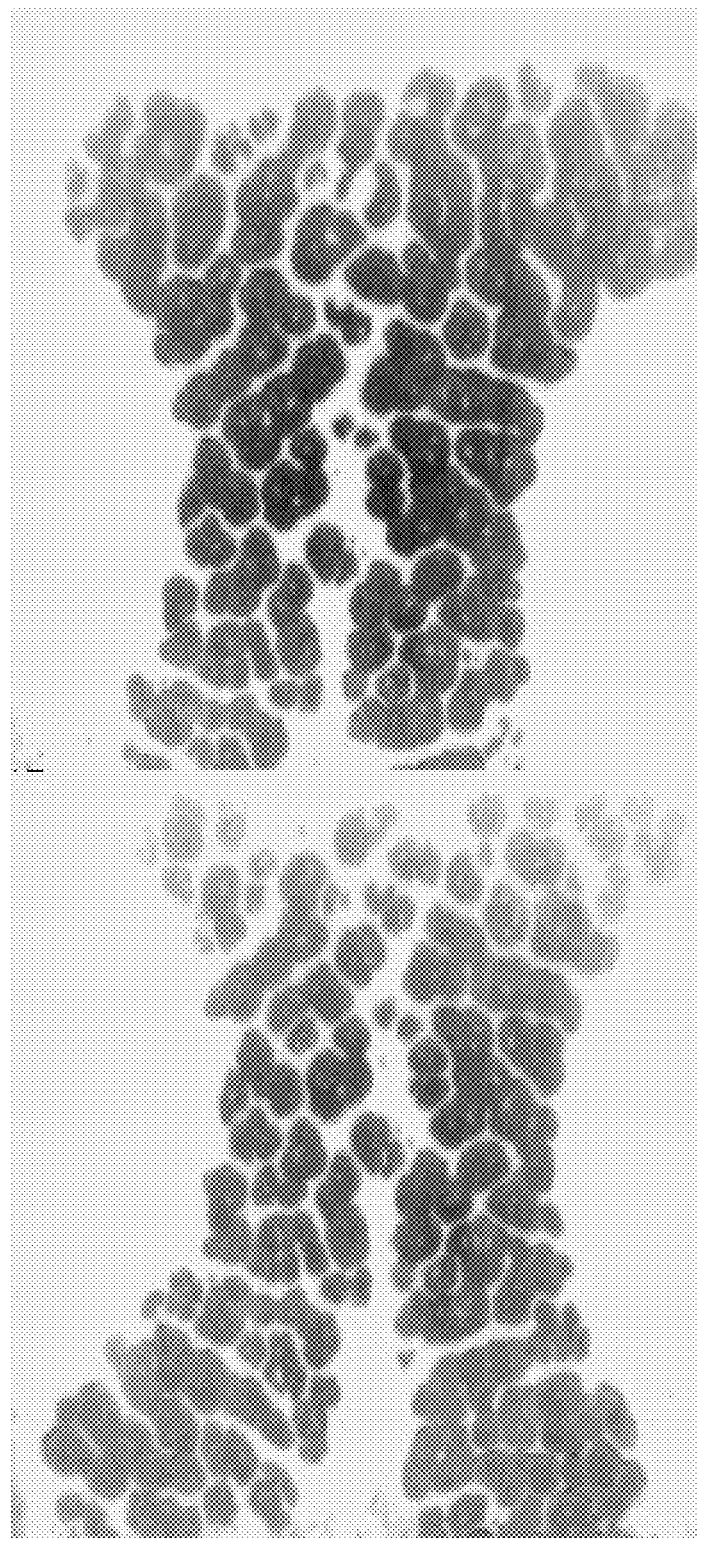
FIG. 9 are nose print images of an adult canine taken from a conventional touch fingerprint sensor.

FIG. 9 shows nose print images of an adult canine captured from a conventional optical fingerprint sensor using a model FS81 from Futronic Technology Co. Ltd. (futronic-tech.com). In two separate instances—initial registration of a pet at point 620 and registering a lost pet at point 712—a pet's nose print is captured and converted into a template that is (i) unique to the pet and (ii) in computer readable format allowing for efficient data transfer, storage, comparison, identification and/or matching. The irregular shapes in the nose print and locations of these irregular shapes in FIG. 9 are unique to each pet. The present design converts the nose print image, which contains certain irrelevant data and is not in a format readable by a computer, into an array of points on a two dimensional surface that is unique to that pet. This unique two-dimensional array can alternatively be expressed mathematically as a list of numbers that are distanced from one or more other numbers by x and y distance coordinates. The complexity (and uniqueness) of this list increases as the number of unique points increases.

Figure 10:
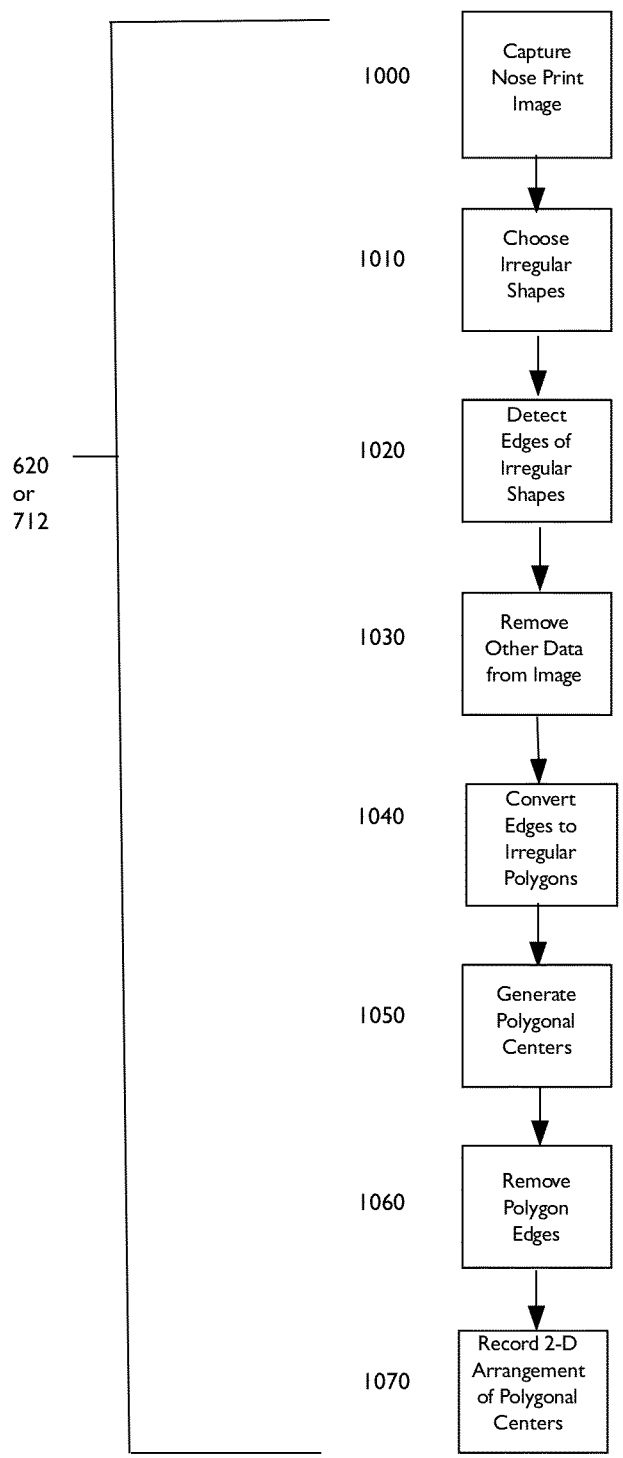
FIG. 10 is a flowchart illustrating obtaining a unique, usable, and portable template from a pet's nose print.

FIG. 10 is an exemplary diagram of a method to convert a nose print image to a pattern or template that is unique to a pet in which embodiments of the present design may be implemented. The flowchart of FIG. 10 is a detailed representation of points 620 in FIG. 6 and point 712 in FIG. 7 and represents various sub-functions performed in one embodiment of the functions represented by points 620 and 712. Point 1000 is receipt or capture of the nose print image of the subject animal. In one embodiment, the central processing unit 112 or 120 (CPU) receives and/or determines a representation of the irregular shapes at point 1010 and detects the edges of the each irregular shape in the nose print image at point 1020. Detecting edges of irregular shapes in images using object recognition techniques is generally known. The CPU may remove some or all other data in the image at point 1030 leaving an outline of only the edges of the irregular shapes. The CPU then converts the edges into irregular polygons at point 1040. Conversion changes the received image into a mathematical expression. Point 1040 is an approximation because one must trade-off accuracy for size and manageability of the ultimate computer file. For example, if each straight-line segment of the polygon is so small that it represents only two pixels on the graphical representation, the file size of the mathematical polygon will be unmanageably large, and matching to a database of hundreds of thousands or even millions of templates will be prohibitively time consuming. Alternatively, if too many pixels are estimated in one straight-line segment of the polygon, the polygon will result in an erroneous approximation of the original irregular shape, and the polygonal center can be inaccurate.

The CPU determines and records the location of the polygonal center of each irregular polygon at point 1050, and calculating the polygonal center of a polygon is generally known. The CPU removes the mathematical data representing the polygon edges leaving only the mathematical data representing the location of polygonal centers of each chosen irregular shape in the nose print at point 1060. Lastly, the two-dimensional arrangement of each of these polygonal centers with respect to each other is stored in the storage unit 114 or 124 for cataloging or matching at point 1070. One feature of the design is that the polygonal centers are referenced, spaced and recorded with respect to one or more polygonal centers and are not tied to a fixed coordinate system; so these data should result in orientation-independent matching. A polygon has known characteristics—(i) it consists of a finite number of straight lines, (ii) each line of a polygon connects to each other line end to end singularly and exclusively to form a chain, and (iii) the first end of the first line connects to the last end of the last line to form a two dimensional enclosed form. The lengths and angles of these lines approximate the irregular shapes of the pet's nose prints. In converting a nose print to polygons, the CPU might need to estimate and close the edges to generate the polygon, again an approximation that decreases the accuracy of the template to the pet's nose print.

FIG. 10 is only exemplary and is not intended to assert or imply any limitation with regard to the environments in which aspects or embodiments of the disclosed embodiments may be implemented. Many modifications to the depicted environments may be made without departing from the spirit and scope of the present invention.

Finally, it is well known in the art how to match a two-dimensional matrix of points (unique to one pet) to a database containing a number of two-dimensional matrices of points (unique to a number of pets) to match a pet to information in a database, such as the pet's name, owner and home address. In general, the accuracy of the match depends on three factors, both in registration and matching—(i) the accuracy of the image of the nose print to the pet's actual nose print, (ii) the accuracy of the polygonal centers generated from the nose print image, and (iii) the accuracy of the matching algorithm. One of the advantages of the preferred embodiment is that any minor variations in the nose print image and any minor variations in approximations of generating the polygons will have little effect on the polygonal center. As an example, the State of Texas can be approximated as a polygon, and its polygonal center (center of Texas) can be calculated. However, cutting the panhandle of Texas in half has a small effect on the location of the polygonal center. Further, the eastern-most border of Texas, which borders the States of Louisiana and Arkansas and is not a straight line because a portion of this border was originally denoted by the Sabine River, can be approximated by a straight line with little effect on the center of the polygon.

Determining a match may employ various measures or techniques. Matching of polygons taken from a visual representation such as that shown in FIG. 9 against a database comprising images including polygons may include (a) comparing centers of polygons, employing a desired degree of accuracy (e.g. 95, or 99, or even 100 percent centers matching is considered a match), (b) drawing lines between polygon centers and comparing the resulting lines between polygon centers, again with a desired degree of accuracy, (c) evaluating polygons with a desired degree of accuracy in position and/or size, again with a desired degree of accuracy, and/or (d) employing any combination of the foregoing (centers, lines, polygons) with a desired degree of accuracy, or any other reasonable means of matching and comparing using values, points, and lines for both the subject image and images taken from the database of images.

As slight differences may result from conditions such as temperature, environmental, or other factors (e.g. damage to the pet's nose), degree of accuracy may be important in determining a match. Further, matching values or accuracies may be employed to find candidate matches. For example, if 10,000 reference/candidate images are available, and group A of this 10,000 images includes 27 matches that are similar to a degree in excess of 95 percent, but none of the images from group A is a 100 percent match, restricting consideration to group A images may be employed. Further, this number may be decreased (and the matching accuracy increased) by matching the lost pet to a subset of these matched pets in a local geographical area because it is well known that most lost pets do not wander far from home when lost. Other narrowing techniques may be employed.

Thus according to the present design, there is provided an animal identification system comprising a biometric sensor configured to capture a biometric feature of an animal as a biometric representation of the animal and a biometric identification module configured to receive the biometric representation of the animal and compare the biometric representation of the animal with stored biometric data for a plurality of animals and evaluate matching characteristics between the biometric representation of the animal and stored biometric data for the plurality of animals. The biometric sensor may comprise a nose print sensor, capacitive sensor, or camera. The biometric feature may include a nose print, an iris image of an eye of the animal, or an image of the unique vein pattern in the sclera of an eye of the animal.

A receiver may be provided, the receiver configured to communicate electronically with the biometric sensor, the receiver configured to receive a nose print associated with the animal. The biometric sensor measures contours associated with a nose of the animal by sensing properties of flesh of the nose of the animal. The system may include a storage unit associated with the biometric identification module, the storage unit configured to store information associated with an identity of at least one animal. A matching system may be provided, the matching system configured to compare the biometric representation of the animal with the stored biometric data of a plurality of pets in order to match the animal with a known animal associated with data in the stored biometric data.

The identification system may include at least one of a data-processing device and a mobile communication device and the system may also or alternately include a keyboard, mouse, data-entry keypad, and/or a touch screen.

One of the biometric sensor and the biometric identification unit may convert the biometric representation into a computer-readable template, wherein converting the biometric representation in one aspect comprises detecting edges of irregular shapes in the biometric representation, converting the edges into irregular polygons, determining and recording one polygonal center for each irregular polygon, and recording a two-dimensional arrangement and spacing of multiple polygonal centers with respect to at least one polygonal center.

Alternately, the present design may comprise an animal cataloging system, comprising a biometric sensor configured to receive a representation of biometric feature of an animal and a biometric catalog module configured to receive the representation of the biometric feature of the animal and store the representation of the biometric feature of the animal with other stored animal biometric data in a database.

One embodiment of the present design is an animal identification method, comprising identifying an animal using an identifying unit, determining a representation of a biometric feature of the animal using at least one biometric sensor, receiving the representation and comparing the representation against at least one of a plurality of stored animal biometric data representations to seek to match the representation a plurality of stored animal representations and potentially determine an identity of the animal.

In another embodiment, an animal cataloging method is provided. The method includes identifying an animal using an input device communicating with an identification unit, determining a representation of biometric feature of the animal using at least one biometric sensor, receiving the representation of the animal at a biometric identification unit, and indexing and storing the representation with stored biometric representations of a plurality of animals.

The devices, processes and features described herein are not exclusive of other devices, processes and features, and variations and additions may be implemented in accordance with the particular objectives to be achieved. For example, devices and processes as described herein may be integrated or interoperable with other devices and processes not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An animal identification system, comprising:
   a biometric sensor configured to capture a biometric feature of an animal as a biometric representation of the animal; and
   a biometric identifier configured to receive the biometric representation of the animal, compare said biometric representation of the animal with stored biometric data for a plurality of animals, and evaluate matching characteristics between the biometric representation of the animal and stored biometric data for the plurality of animals;
   wherein the biometric identifier detects edges in the biometric representation, converts the edges into irregular polygons, and evaluates matching characteristics based on the irregular polygons.

2. The animal identification system of claim 1 wherein said biometric sensor comprises a nose print sensor.

3. The animal identification system of claim 2 wherein said biometric sensor comprises a capacitive sensor.

4. The animal identification system of claim 2 wherein said biometric sensor comprises a camera.

5. The animal identification system of claim 2, further comprising a receiver configured to communicate electronically with said biometric sensor, said receiver configured to receive one of a nose print and a template of the nose print associated with said animal.

6. The animal identification system of claim 2 wherein said nose print sensor measures contours associated with a nose of the animal by sensing properties of flesh of the nose of the animal.

7. The animal identification system of claim 1 wherein said biometric feature comprises one of a nose print and a template of the nose print.

8. The animal identification system of claim 1, further comprising a storage unit associated with said biometric identifier, the storage unit configured to store information associated with an identity of at least one animal.

9. The animal identification system of claim 1, further comprising a matching system configured to compare the biometric representation of the animal with said stored biometric data of a plurality of pets in order to match said animal with a known animal associated with data in the stored biometric data.

10. The animal identification system of claim 1 wherein said identification system comprises at least one of a data-processing device and a mobile communication device.

11. The animal identification system of claim 1 further comprising one from the group comprising:
   a keyboard;
   a mouse;

a data-entry keypad; and a touch screen.

12. The animal identification system of claim 1 wherein the biometric identifier converts the biometric representation into a computer-readable template comprising the edges.

13. The animal identification system of claim 12 wherein converting the biometric representation further comprises:

determining and recording one polygonal center for each irregular polygon; and recording a two-dimensional arrangement and spacing of multiple polygonal centers with respect to at least one polygonal center.

14. An animal cataloging system, comprising:

a biometric sensor configured to receive a representation of biometric feature of an animal; and a biometric catalog module configured to receive the representation of the biometric feature of the animal and store said representation of the biometric feature of the animal with other stored animal biometric data in a database;

wherein the biometric catalog module is configured to detect edges in the representation of the biometric feature of the animal, convert the edges into irregular polygons, and evaluate matching characteristics between the representation of the biometric feature of the animal and other stored animal biometric data based on the irregular polygons.

15. The animal cataloging system of claim 14 wherein said biometric sensor comprises a nose print sensor.

16. The animal cataloging system of claim 15 wherein said biometric sensor comprises a capacitive sensor.

17. The animal cataloging system of claim 14 wherein said biometric feature comprises one of a nose print and a template of a nose print.

18. The animal cataloging system of claim 17, further comprising a receiver configured to communicate electronically with said biometric sensor and receive one of the nose print and template of the nose print of said animal.

19. The animal cataloging system of claim 17 wherein said nose print sensor measures contours associated with a nose of the animal by sensing properties of the nose flesh of said animal.

20. The animal cataloging system of claim 14 further comprising a storage unit configured to communicate with said biometric cataloging module and store information associated with an identity of at least one animal.

21. The animal cataloging system of claim 14 further comprising at least one of a data-processing device and a mobile communication device.

22. The animal cataloging system of claim 14 further comprising one from the group comprising:

a keyboard;

a mouse;

a data-entry keypad; or a touch screen.

23. The animal identification system of claim 14 wherein the biometric catalog module converts the biometric representation of the animal into a computer-readable template comprising the edges.

24. The animal identification system of claim 23 wherein converting the biometric representation of the animal further comprises:

determining and recording one polygonal center for each irregular polygon; and recording a two-dimensional arrangement and spacing of multiple polygonal centers with respect to at least one polygonal center.

25. An animal identification method, comprising:

identifying an animal using an identifying unit;

determining a representation of a biometric feature of said animal using at least one biometric sensor, wherein said determining comprises detecting edges in the representation and converting the edges into irregular polygons;

receiving the representation; and comparing at least one of the irregular polygons against at least one of a plurality of stored animal biometric data representations to seek to match the representation a plurality of stored animal representations and potentially determine an identity of said animal.

26. The animal identification system of claim 25 wherein determining the biometric feature of the animal further comprises converting data into a computer-readable template comprising the edges.

27. The animal identification system of claim 26 wherein converting data further comprises:

determining and recording one polygonal center for each irregular polygon; and recording a two-dimensional arrangement and spacing of multiple polygonal centers with respect to at least one polygonal center.

28. An animal cataloging method, comprising:

identifying an animal using an input device communicating with an identification unit;

determining a representation of biometric feature of said animal using at least one biometric sensor, wherein said determining comprises detecting edges in the representation and converting the edges into irregular polygons;

receiving the representation of the animal at a biometric identifier; and indexing and storing said representation with stored biometric representations of a plurality of animals.

* * * * *